United States Patent
Tanizawa et al.

(10) Patent No.: US 9,054,890 B2
(45) Date of Patent: Jun. 9, 2015

(54) COMMUNICATION APPARATUS

(75) Inventors: Yoshimichi Tanizawa, Yokohama (JP); Kotaro Ise, Kawasaki (JP); Eiji Kamagata, Kamakura (JP); Tsuyoshi Kogawa, Kawasaki (JP); Takeshi Ishihara, Yokohama (JP); Yuichiro Oyama, Fuchu (JP); Takaomi Murakami, Fuchu (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 722 days.

(21) Appl. No.: 13/428,308

(22) Filed: Mar. 23, 2012

(65) Prior Publication Data

US 2012/0242461 A1    Sep. 27, 2012

(30) Foreign Application Priority Data

Mar. 25, 2011   (JP) ................................. 2011-068669

(51) Int. Cl.
    *H04L 12/28*   (2006.01)
(52) U.S. Cl.
    CPC ........ *H04L 12/2816* (2013.01); *G08C 2201/20* (2013.01)
(58) Field of Classification Search
    CPC   G06F 17/3053; G08C 2201/20; H04B 17/00; H04L 12/2431; H04L 12/26; H04L 12/2816; H04L 41/0823; H04L 41/12; H04L 45/02; H04M 1/7253; H04W 24/02; H04W 24/10; H04W 28/16; H04W 28/18; H04W 4/00; H04W 48/02; H04W 48/16; H04W 52/04; H04W 52/146; H04W 52/241; H04W 52/245; H04W 68/02; H04W 72/04; H04W 72/0473; H04W 72/085; H04W 74/002; H04W 76/02; H04W 76/021; H04W 8/005; H04W 84/18
    USPC .......................................................... 370/252
    See application file for complete search history.

(56) References Cited

U.S. PATENT DOCUMENTS 8,483,741 B1 *   7/2013   Hussain et al. ............... 455/522
2005/0255843 A1 *   11/2005   Hilpisch et al. ............... 455/425

(Continued)

FOREIGN PATENT DOCUMENTS

JP   2002-165281 A   6/2002
JP   2005-033446 A   2/2005

(Continued)

OTHER PUBLICATIONS

Japanese First Office Action dated Jun. 25, 2013 from Japanese Patent Application No. 2011-068669; 5 pages.

(Continued)

*Primary Examiner* — Gary Mui
*Assistant Examiner* — Michael Phillips
(74) *Attorney, Agent, or Firm* — Ohlandt, Greeley, Ruggiero & Perle, L.L.P.

(57) ABSTRACT

According to an embodiment, a communication apparatus controls controllable nodes. The apparatus includes an acquisition unit and a generation unit. The acquisition unit acquires at least one of a first evaluation value indicating an occurrence frequency of a control request to a target controllable node and a second evaluation value indicating an occurrence frequency of communication error at the target controllable node. The generation unit generates identification information to be assigned to control the target controllable node in a manner such that a bit length of the identification information becomes shorter as at least one of the first evaluation value and the second evaluation value increases.

2 Claims, 10 Drawing Sheets

(56) References Cited

U.S. PATENT DOCUMENTS

| | | | |
|---|---|---|---|
| 2006/0253488 A1* | 11/2006 | Akaiwa | 707/102 |
| 2007/0004431 A1* | 1/2007 | Twitchell, Jr. | 455/461 |
| 2007/0177613 A1* | 8/2007 | Shorty et al. | 370/401 |
| 2008/0013502 A1* | 1/2008 | Clark | 370/338 |
| 2009/0059842 A1* | 3/2009 | Maltseff et al. | 370/328 |
| 2009/0296602 A1* | 12/2009 | Bange et al. | 370/254 |
| 2011/0287795 A1* | 11/2011 | Cahill | 455/509 |
| 2012/0106346 A1* | 5/2012 | Aguirre et al. | 370/237 |

FOREIGN PATENT DOCUMENTS

| | | | |
|---|---|---|---|
| JP | 2006-060515 A | 3/2006 | |
| JP | 2007036541 A | 2/2007 | |
| JP | 2007241380 A | 9/2007 | |
| JP | 2008-022573 A | 1/2008 | |
| JP | 2008301267 A | 12/2008 | |
| JP | 2010130096 A | 6/2010 | |
| JP | 2010219869 A | 9/2010 | |
| WO | WO 94/10685 A1 | 5/1994 | |

OTHER PUBLICATIONS

First Office Action dated Feb. 12, 2013 for corresponding Japanese Patent Application No. 2011-0686669 with English translation (7 pages).

Japanese Decision of Rejection dated Nov. 26, 2013 (with English translation) from Japanese Patent Application No. 2011-068669; 4 pages.

* cited by examiner

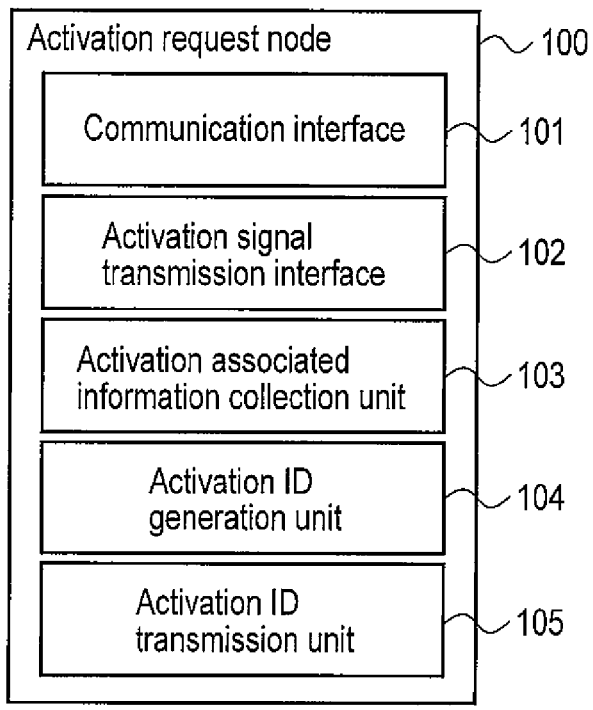
F I G. 1
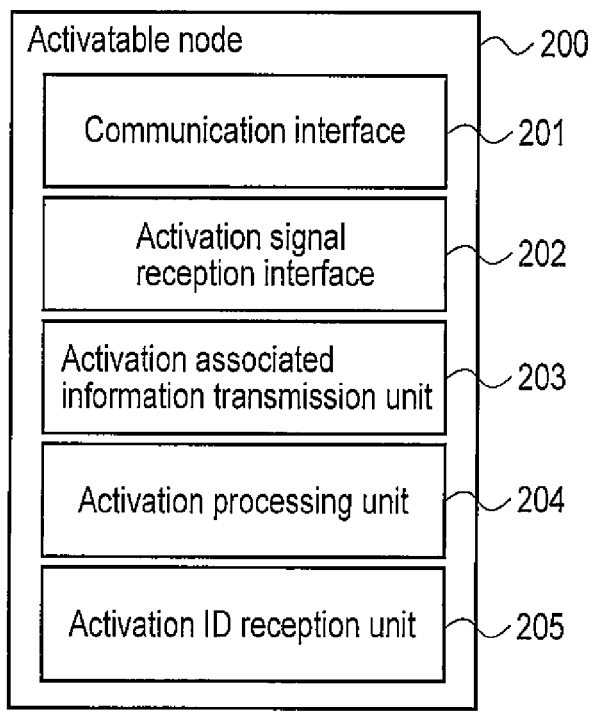
F I G. 2

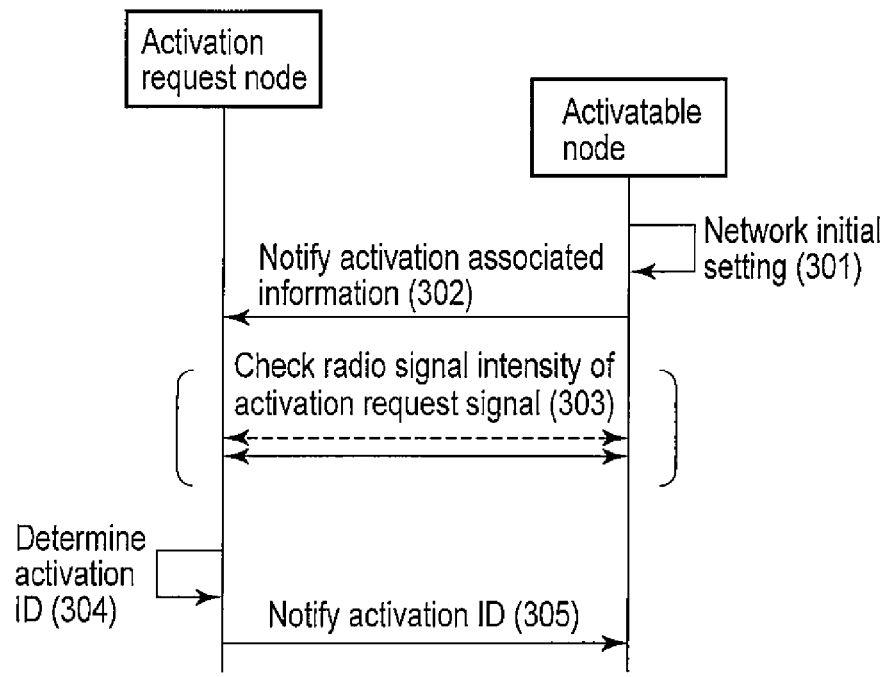
F I G. 4
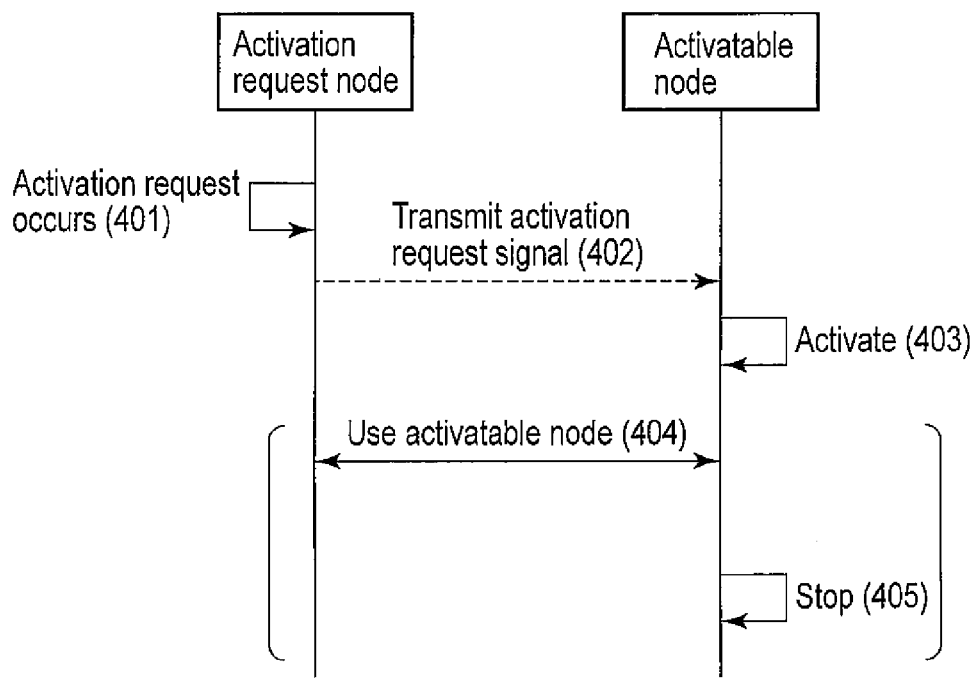
F I G. 5

| 1 | 2 | 3 | 4 | 5 |
|---|---|---|---|---|
| 6 | 7 | 8 | 9 | 10 |
| 11 | 12 | 13 | 14 | 15 |

| 1 | 2 | 3 | 4 |
|---|---|---|---|
| 5 | 6 | 7 | 8 |
| 9 | 10 | 11 | 12 |
| 13 | 14 | 15 | 16 |
| 17 | 18 | 19 | 20 |
| 21 | 22 | 23 | 24 |

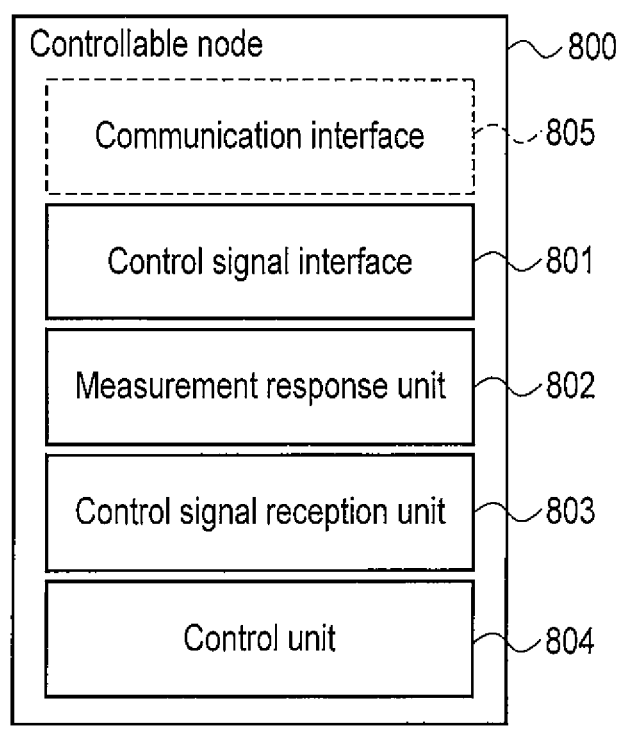
F I G. 11

| Controllable radio signal intensity | Controllable nodes |
|---|---|
| 1 | R1, R2, R6 |
| 2 | R3, R7, R8 |
| 3 | R4, R9, R0 |
| 4 | R5 |
F I G. 13
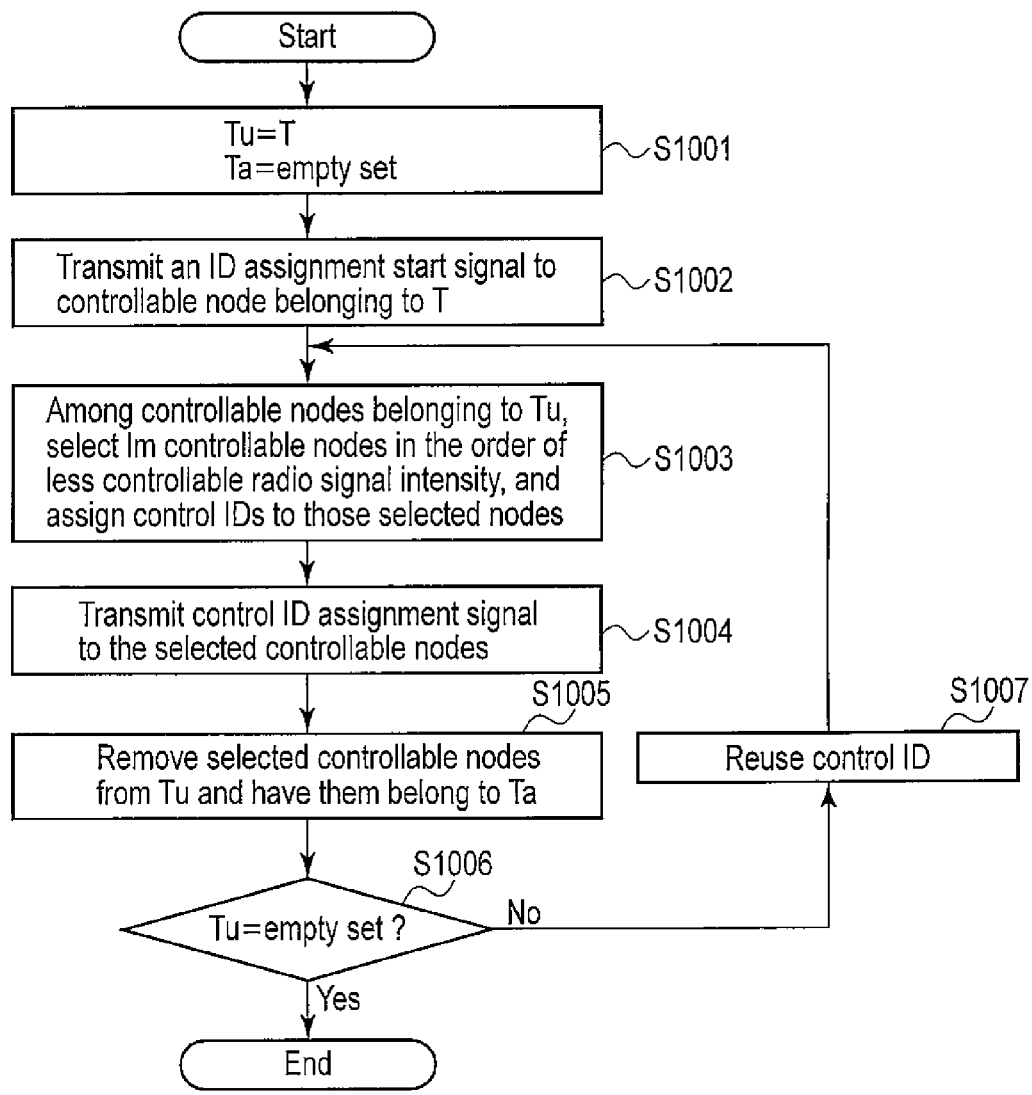
F I G. 14

COMMUNICATION APPARATUS

CROSS-REFERENCE TO RELATED APPLICATIONS

This application is based upon and claims the benefit of priority from prior Japanese Patent Application No. 2011-068669, filed Mar. 25, 2011, the entire contents of which are incorporated herein by reference.

FIELD

Embodiments described herein relate generally to remote control of nodes.

BACKGROUND

When a node (i.e., a controllable node) is distant from another node (i.e., a control request node) in a communication system, there is a need for remote control of the controllable node by the control request node. For example, if it is possible for the control request node to activate the controllable node remotely, power consumption can be reduced by putting the controlled node in an idle state (non-active state) for most of the time. Such remote activation of nodes can be realized by an out-of-band scheme using, for example, radio signals. An out-of-band scheme is a procedure of transmitting and receiving signals via a communication link which is different from a usual communication link (i.e., an alternative path).

If it is assumed that there are plural nodes in a communication system, it is desirable to integrate functions such as a function of transmitting various control signals to a controllable node and a function of managing a state of controllable node (for example, active/non-active state), to a proxy node, not to a node individually. According to such a structure, the communication system can be simplified. In such the structure, a control request node can be equated with the proxy node.

To control controllable nodes remotely, a control ID designating an individual controllable node can be used. Herein, there is trade-off regarding the size of a control ID. More specifically, in the communication system, in order to assign the control ID for each controllable node arbitrarily and perform remote control on more controllable nodes individually, more control IDs are required. In other words, it is necessary to increase the bit length of the control ID. However, increased bit length of the control ID would increase the frequency of data error at radio transmission of the control ID (in other words, failure of remote control), increase power consumed by a controlled node to wait and receive a control ID, and increase power consumed by a control node to transmit a control ID.

BRIEF DESCRIPTION OF THE DRAWINGS

FIG. 1 is a block diagram showing an activation request node according to the first embodiment.

FIG. 2 is a block diagram showing an activatable node according to the first embodiment.

FIG. 4 is a diagram showing a sequence related to addition of an activatable node.

FIG. 5 is a diagram showing a sequence related to activating an activatable node.

FIG. 11 is a block diagram showing a controllable node according to the second embodiment.

FIG. 13 shows an example of a controllable node list.

FIG. 14 is a flowchart of a process of assigning a control ID.

DETAILED DESCRIPTION

In the following, the embodiments will be explained with reference to the drawings.

In general, according to an embodiment, a communication apparatus controls a plurality of controllable nodes including a target controllable node. The apparatus includes an acquisition unit and a generation unit. The acquisition unit acquires at least one of a first evaluation value indicating an occurrence frequency of a control request to the target controllable node and a second evaluation value indicating an occurrence frequency of communication error at the target controllable node. The generation unit generates identification information to be assigned to control the target controllable node in a manner such that a bit length of the identification information becomes shorter as at least one of the first evaluation value and the second evaluation value increases.

Figure 3:
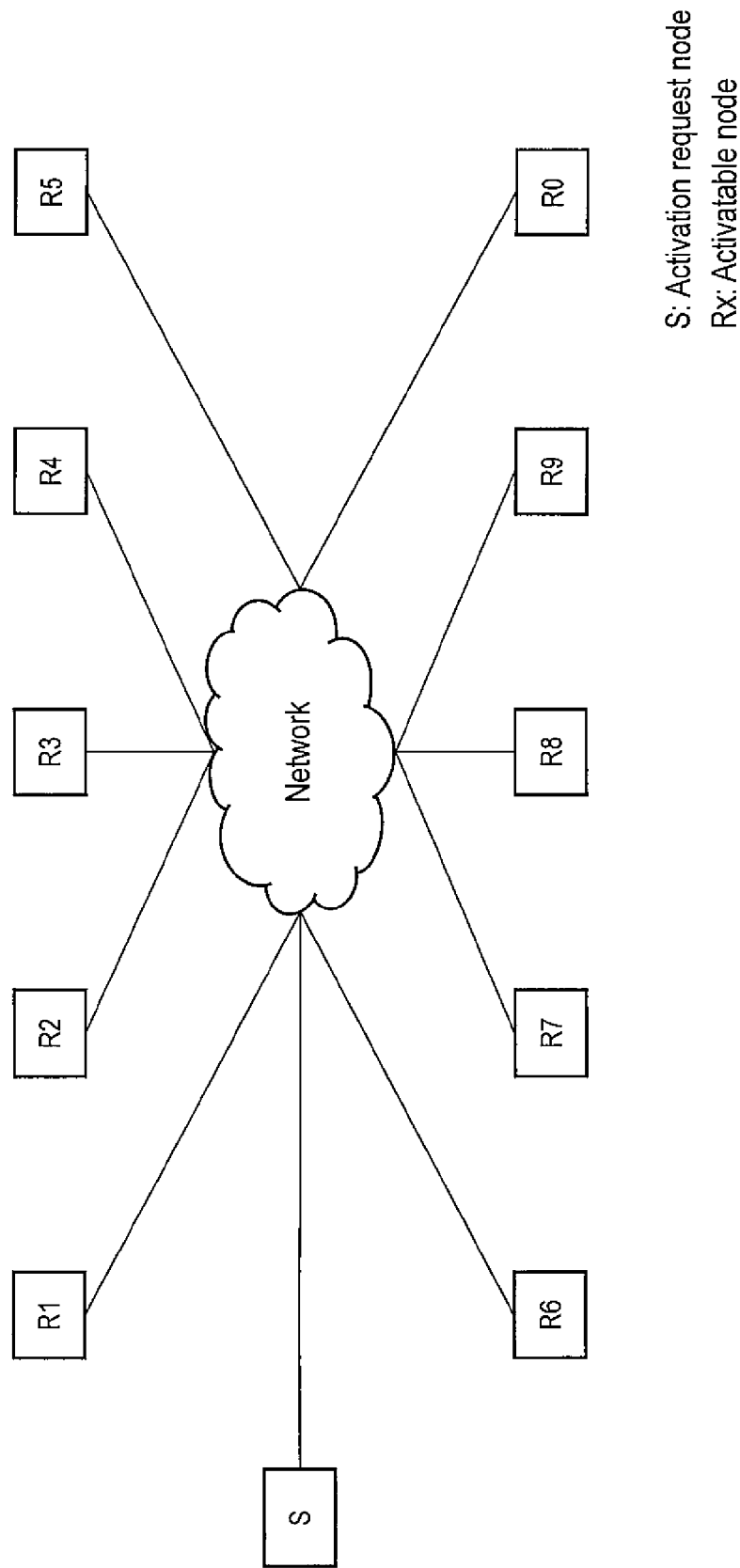
FIG. 3 is an exemplary diagram of a communication system.

In each embodiment that will be described herein, the communication system shown in FIG. 3 is assumed. In the communication system, unitary control request node S (for example, a proxy node) to control a plurality of controllable nodes Rx are provided. The plurality of controllable nodes and a control request node are connected through network. In the following explanation, the control request node and the controllable nodes may be simply referred to as a node or a communication apparatus.

The network is a network infrastructure that enables each node to communicate with other nodes through a communication interface. The network includes a plurality of switches, etc. The switches connect the communication interface of each node to a network, and they act as an intermediate in a communication between nodes. The connection scheme between each node and the switches is not limited to a wired local area network (LAN). It could be a wireless LAN. If the connection scheme is a wireless LAN, in general, the switches are called an access point. However, in the following description, an access point and a switch will not be distinguished, and both will be referred to as a "switch."

The control request node typically comprises a communication interface using network (for example, a wireless LAN interface) and a transmission interface to transmit a control request signal in accordance with, for example, a short-range wireless communication scheme. The control request node transmits a control request signal including a control ID assigned to a controllable node in accordance with, for example, a request from an application. The controllable node receives such a control request signal and is operated on the basis of the signal.

The controllable node typically comprises a communication interface using network (for example, a wireless LAN interface) and a transmission interface to receive a control request signal in accordance with, for example, a short-range wireless communication scheme. A controllable node is operated in accordance with a type of a request control signal, when the controllable node receives a control request signal including a control ID corresponds to the assigned control ID. For example, the controllable node performs activation process if the received control request signal requests activation, and transfers to an activated state (for example, a power of a functional unit for network communication is turned on).

In FIG. 3 as a communication system in which a proxy node transmits a control request signal collectively in response to a request from a plurality of control request nodes is assumed, FIG. 3 depicts the system as if there is only one control request node. However, each embodiment is not limited to the communication system in FIG. 3, and each embodiment can be applied to a communication system in which a plurality of control request nodes can transmit control request signals independently. For example, the controllable node shown in FIG. 3 may have a function as a control request node in addition to a function as a controllable node (First Embodiment)

The control request node according to the first embodiment has an object to assign a bit length of a control ID which is mainly used for remote control of controllable nodes in consideration of the efficiency of the communication system as a whole. In the following explanation, node activation in the present embodiment will be explained as an example of node control, and node activation will be the main topic in the explanation. However, the present embodiment is applicable to other types of node control as well as node activation. In other words, the word "activation" in the following explanation can be read as "control" as needed.

As shown in FIG. 1, the activation request node 100 according to the first embodiment comprises a communication interface 101, an activation signal transmission interface 102, an activation associated information collection unit 103, an activation ID generation unit 104, and an activation ID transmission unit 105. The activation request node 100 according to the present embodiment can activate an activatable node remotely (for example, an activatable node 200), as will be described later.

The communication interface 101 performs a communication via the network illustrated in FIG. 3. The communication interface 101 may be a wireless LAN interface, or any interface that supports other communication schemes. For example, the communication interface 101 is used to notify an activatable node of an activation ID which will be described later, and to collect activation associated information, which will be described later, from an activatable node.

The activation signal transmission interface 102 is mainly used for transmitting an activation request signal, which will be described later, to an activatable node. Typically, the activation signal transmission interface 102 is an interface that supports a certain type of wireless communication scheme, and in the following description, it is assumed that an activation request signal is wirelessly transmitted. However, note that the activation signal transmission interface 102 may be an interface for a wired communication. What is important here is that the activation signal transmission interface 102 is different from the communication interface 101, and it is dedicated for out-of-bounds scheme. The activation signal transmission interface 102 may be used to check radio signal intensity of an activation request signal, as will be described later.

The activation associated information collection unit 103 collects various activation associated information, which will be described later, and stores them. The activation associated information collection unit 103 may include a database for storing collected activation associated information, or may have an external database store activation associated information. The activation associated information may or may not be transmitted from an activatable node. Specific examples of the activation associated information will be described later.

The activation ID generation unit 104 generates an activation ID to be assigned to each controlled node based on the activation associated information collected by the activation associated information collection unit 103. The activation ID is information to identify each activatable node, and is included in an activation request signal. Desirably, the activation ID should be uniquely assigned to an activatable node. However, depending on structure of the activation ID, there may be a situation where the same activation ID has to be assigned to more than one activatable node, similarly to the second embodiment which will be described later. The activation ID is dynamically determined by, for example, the sequence illustrated in FIG. 4, independently from identification information (for example, IP address) which is used by the communication interface 101 to address the other end of communication. The activation ID assigned to a given activatable node may be changed by, for example, the sequence illustrated in FIG. 6 during the operation of communication system in accordance with addition of other activatable nodes to the communication system or changes in a radio signal status. An algorithm to be performed by the activation ID generation unit 104 in order to determine an activation ID will be described later.

The activation ID transmission unit 105 generates an activation request signal including an activation ID assigned to a desired activatable node, and transmits it using the activation signal transmission interface 102. The process of transmitting an activation request signal (for example, adding a parity bit, radio coding, e.g., modulation, etc.) will be described later.

The activation request node 100 may include a constituent element not shown in FIG. 1. For example, the activation request node 100 may include a functional unit to receive a request of transmitting an activation request signal to a specific activatable node from other node (such a functional unit may be called, for example, "a request reception unit") and another functional unit to utilize an application of an activatable node that has already been activated via a network (such a functional unit may be called, for example, "an application execution unit"). With respect to collecting activation associated information, the activation request node 100 may further include a functional unit to manage the number of times a communication error occurs (or the number of times retransmission is performed) and a functional unit to manage time that has elapsed since addition to a system for each activatable node.

As shown in FIG. 2, the activatable node 200 according to the present embodiment includes a communication interface 201, an activation signal reception interface 202, and an activation associated information transmission unit 203, an activation processing unit 204, and an activation ID reception unit 205. Upon receiving an activation request signal including an assigned activation ID, the activatable node 200 transfers from an activation stand-by state (a non-activated state) to an activated state. In the following explanation, "activation" refers to "transferring from the activation stand-by state to an activated state." In a communication system, the other activatable nodes comprise the same or similar constituent elements as the activatable node 200.

The communication interface 201 performs a communication via the network illustrated in FIG. 3. The communication interface 201 may be a wireless LAN interface, or any interface supporting different communication schemes. For example, the communication interface 201 is used to receive a notification of activation ID from an activation request node and to transmit activation associated information to an activation request node.

The activation signal reception interface 202 is mainly used for receiving an activation request signal from the activation request node 100. Typically, the activation signal reception interface 202 is an interface that supports some type of wireless communication scheme. It could be a wired communication interface. As will be described later, the activation signal reception interface 202 may be used to check radio intensity of an activation request signal. The activation associated information transmission unit 203 transmits activation associated information to the activation request node 100, using, for example, the communication interface 201.

The activation ID reception unit 205 waits for an activation request signal including an activation ID assigned to the activatable node 200, when the activatable node 200 is in non-activated state. More specifically, the activation ID reception unit 205 receives the activation request signal from the activation request node 100, using the activation signal reception interface 202. Upon receiving the activation request signal, the activation ID reception unit 205 requests the activation processing unit 204 to activate the activatable node 200. The activation ID assigned to the activatable node 200 is received using, for example the communication interface 201, and is stored in the activatable node 200

The activation processing unit 204 performs activation processing on the activatable node 200 and network initial setting processing, which will be described later. More specifically, the activation processing unit 204 performs the activation processing to activate the activatable node 200 when the activation of the activatable node 200 is requested from the activation ID reception unit 205.

The activatable node 200 may include constituent elements that are not shown in FIG. 2. For example, the activatable node 200 may include a functional unit which allows other nodes to use local applications via network (such a functional unit may be called as, for example, "an application execution unit").

Figure 6:
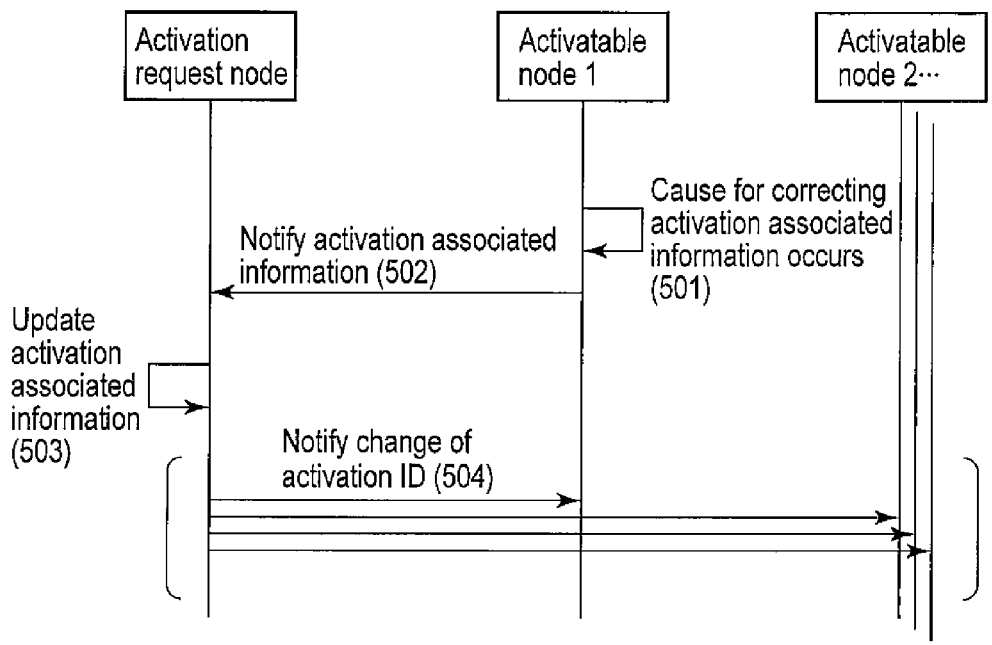
FIG. 6 is a diagram showing a sequence related to updating activation associated information.

As a preparation stage to enable the activation request node 100 to activate the activatable node 200 remotely, a sequence related to adding an activatable node 200 is performed. By such a sequence, an activation ID to be assigned to the activatable node 200 is determined and notified to the activatable node 200. An example of the sequence is shown in FIG. 4. In FIG. 4 and FIGS. 5 and 6 which will be explained later, the solid-line arrow(s) between nodes indicate communication using the communication interface 101 and 201, and the broken-line arrow(s) between nodes indicate communication using the activation signal transmission interface 102 and the activation signal reception interface 202.

In the initial state of the sequence shown in FIG. 4, the activation request node 100 is connected to a network, and the node can perform a communication on the network using the communication interface 101. Other nodes not shown in FIG. 4 may be added to the communication system by the sequence in advance.

First, the activation processing unit 204 of the activatable node 200 performs network initial setting (procedure 301). In procedure 301, the activation processing unit 204 receives an IP address assignment from, for example, a Dynamic Host Configuration Protocol (DHCP) server on the network, or someone (for example, an administrator) manually sets an IP address for the activatable node 200 via the activation processing unit 204. Procedure 301 may be realized by other techniques that are not disclosed herein. As a result of procedure 301, the activatable node 200 can perform a communication on a network using the communication interface 201.

After procedure 301 is completed, the activation associated information transmission unit 203 of the activatable node 200 transmits activation associated information to the activation request node 100 using the communication interface 201 (procedure 302). The activation associated information transmitted in procedure 302 may include a type of the activatable node, predicted activation frequency, reception sensitivity information at the activation signal reception interface 202, physical position information of the activatable node. Then, the activation association information collection unit 103 of the activation request node 100 receives the activation associated information using the communication interface 101. When the activation associated information collection unit 103 stores the received activation associated information, the information is associated with the activatable node 200 (procedure 303-5).

An IP address for the activation request node 100 may be acquired by an arbitrary method. Typically, in procedure 301 described above, the activation processing unit 204 acquires an IP address for the activation request node 100 from, for example, a DHCP server on the network, or someone manually sets an IP address for the activation request node via the activation processing unit 204.

It is possible to add an optional procedure 303 before or after procedure 302. This procedure 303 can be omitted. According to procedure 303, signal intensity (reception strength) of an activation request signal at the activation signal reception interface 202 is measured, and it is checked by the activation request node 100. In other words, in procedure 303, it is necessary to have the activation signal transmission interface 102 and the activation signal reception interface 202 function. Although a specific example of procedure 303 will be described, procedure 303 may be replaced with an arbitrary procedure of checking radio signal intensity.

First, the activation request node 100 transmits some code information to the activatable node 200, using the communication interface 101 (procedure 303-1). The activatable node 200 receives the code information transmitted in procedure 303-1 using the communication interface 201, and returns a response signal to the activation request node (procedure 303-2). The activation request node 100 receives the response signal transmitted in procedure 303-2, using the communication interface 101.

Next, the activation request node 100 transmits the same code information as that transmitted in procedure 303-1 to the activatable node 200, using the activation signal transmission interface 102 (procedure 303-3). The activatable node 200 receives the code information transmitted in procedure 303-3 using the activation signal reception interface 202, and measures reception intensity of the signal. The activatable node 200 notifies the activation request node 100 of the measured reception intensity using the communication interface 201 (procedure 303-4).

The above procedures 303-1, . . . 303-4 are iterated for several times between the activation request node 100 and the activatable node 200. Then, the activation associated information collection unit 103 of the activation request node 100 generates radio signal intensity information of the activatable node 200 (for example, statistic value of collected reception intensity) based on the collected reception intensity, and stores the information in association with the activatable node 200 as an element of the activation associated information (procedure 303-5).

The activation ID generation unit 104 of the activation request node 100 determines an activation ID to be assigned to the activatable node 200 based on the activation associated information collected in procedure 302 (and procedure 303) (procedure 304). As will be described later, when activation IDs have already been assigned to other activatable nodes, the activation associated information of those nodes is considered when determining an activation ID for the activatable node 200. The activation ID generation unit 104 stores the determined activation ID in association with the activatable node 200. The activation ID is stored in, for example a database that the activation ID transmission unit 105 can access. The details of the algorithm that the activation ID generation unit 104 performs in procedure 304 will be explained later.

The activation request node 100 notifies the activatable node 200 of the activation ID determined in procedure 304, using the communication interface 101 (procedure 305). The activatable node 200 receives the activation ID from the activation request node 100 using the communication interface 201. The activation ID is stored in, for example, a database that the activation ID reception unit 205 can access. The sequence shown in FIG. 4 is completed with the completion of procedure 305. At the non-activated state after the sequence of FIG. 4 is completed, the activation ID reception unit 205 of the activatable node 200 waits for the activation ID that has been assigned.

After the completion of the sequence of FIG. 4, the activatable node 200 may transfer to the non-activated state immediately. By immediately transferring the activatable node 200 to the non-activated state, power consumed by the activatable node 200 can be reduced. Particularly, in a case of driving the activatable node 200 by a battery, the reduction of power consumption leads to extension of the life of the activatable node 200 (extension of operation time).

When the sequence shown in FIG. 4 is completed, the activation request node 100 can remotely activate the activatable node 200 at a desired timing. For example, through the sequence related to the activation of the activatable node 200 as illustrated in FIG. 5, the activation request node 100 activates the activatable node 200 remotely.

At the initial state of the sequence of FIG. 5, the activation ID has been already assigned to the activatable node 200 through the sequence illustrated in FIG. 4. The activatable node 200 is in the non-activated state.

An activation request to the activatable node 200 occurs at the activation request node 100 (procedure 401). For example, in a situation where the activation request node 100 needs to use services and information provided by the activatable node 200, such an activation request occurs. It can be also predicted that an activation request occurs at other node and this node requests the activation request node 100 to activate the activatable node 200. An activation ID for the activatable node 200 is not necessarily designated in the activation request if only identification information of the activatable node, such as an IP address, has been designated. The activation request node 100 can convert an IP address to a corresponding activation ID using a database. It should be noted that the activation request node 100 knows whether the activatable nodes in the communication system are in the activated state or not. When the activation request node 100 detects that the activatable node 200 which is a target of the activation request is in the activated state, the continuation of the sequence of FIG. 5 may be canceled.

The activation ID transmission unit 105 of the activation request node 100 transmits, to the activatable node 200, an activation request signal including at least an activation ID of the activatable node 200 which is a target of the activation request occurred in procedure 401 (procedure 402). The activation request signal may carry the activation ID, or carry other information in addition to the activation ID (for example, parameter information required for activation, control information defining operation of the node after activation, etc.). When the activatable node 200 does not get activated regardless of the transmission of the activation request signal, the activation ID transmission unit 105 may retransmit the activation request signal (in other words, procedure 402 may be carried out again).

The activation ID reception unit 205 of the activatable node 200 receives the activation request signal transmitted in procedure 402, using the activation signal reception interface 202, and requests the activation processing unit 204 to activate the activatable node 200 (procedure 403). The activation processing unit 204 may or may not carry out initial setting of the network during the process of activating the activatable node 200. If the initial setting of the network is not carried out, the activation processing unit 204 can apply the latest setting (for example a setting at the time of the transferring to the current non-activated state). If the initial setting is carried out, the activation processing unit 204 can carry out the same process or one similar to, for example, procedure 301 shown in FIG. 4. Remote activation of the activatable node 200 is realized upon the completion of procedure 403.

Procedure 403 may be followed by both or one of the optional procedures 404 and 405. If both of procedures 404 and 405 follow, procedure 405 should follow procedure 404. In other words, the sequence shown in FIG. 5 should be completed with the completion of any of procedures 403, 404 and 405.

In procedure 404, the activation request node (or other nodes) utilizes services and information provided by the activatable node 200, using the communication interface 101. The nature of procedure 404 may vary in accordance with an application executed by the activatable node 200.

In procedure 405, the activation processing unit 204 of the activated node 200 stops the activatable node 200 (in other words, the node 200 is transferred from the activated state to the non-activated state). According to the procedure 405, consumption power at the activatable node 200 can be reduced.

The stop operation of the activatable node 200 in procedure 405 may be triggered by an instruction from the activation request node 100 (or other nodes). The sequence in this case (that is, a case in which the activation request node 100 remotely stops the activatable node 200) is similar to the sequence shown in FIG. 5 (the sequence in which the activation request node 100 remotely activates the activatable node 200). The stop operation can be explained using the similar stream of operations to shown in FIG. 5 by replacing "activate" with "stop."

When procedure 404 is performed before procedure 405, the timing of performing procedure 405 depends on the time when procedure 404 is completed. As stated above, the nature of procedure 404 (for example, the timing to complete) may vary by applications executed by the activatable node 200 in procedure 404.

As described above, an activation ID assigned to each activatable node is determined based on the activation associated information. In other words, if the nature of the activation associated information changes, there may be a need to change the activation ID. Accordingly, the activation request node 100 updates the activation associated information by performing the sequence illustrated in FIG. 6 to change an activation ID to be assigned to each activatable node, as needed. However, the sequence of FIG. 6 is only optional, so there may be a case where the sequence is unnecessary at all. For example, if the operation environment of the communication system is fixed, the activation associated information may not change so significantly, and accordingly, the need for performing the sequence may not be so significant.

At the initial state of the sequence of FIG. 6, an activation ID has been already assigned to each of the activatable node 200 (activatable node 1 in FIG. 6) and other activatable nodes (activatable node 2, . . . in FIG. 6) through the sequence of FIG. 4, etc. It should be noted that the activatable node 200 is in the activated state.

A cause for correction of the activation associated information occurs at the activatable node 200 (procedure 501). For example, when the physical position of the activatable node 200 is moved, physical position information may change, and radio signal intensity information may also change. When a presumed environment that the activatable node 200 is used is changed (for example, when the activatable node 200 becomes a secondary node for a certain service from a master node), or when providing a new service begins, there may be a change in the frequency of activating the activatable node 200, or the actual measured value of the frequency may be greatly change from that in the past. Further, when the number of times the activatable node 200 is activated or the elapsed time since the activatable node 200 is added to the system exceeds a threshold, it can be considered that a cause for correction is occurred.

The activation associated information transmission unit 203 of the activatable node 200 notifies the activation request node 100 of the activation associated information which needs to be corrected in procedure 501, using the communication interface 201. It should be noted that the activation associated information transmission unit 203 does not have to notify all activation associated information.

The activation associated information collection unit 103 of the activation request node 100 receives the activation associated information transmitted in procedure 502 using the communication interface 101, and updates the activation associated information stored in, for example, a database (procedure 503).

Along with procedure 503, the activation ID generation unit 104 may perform the same procedure as or one similar to procedure 305 shown in FIG. 4 to re-determine an activation ID. However, such a process is optional, and it does not have to be performed at all, or may be selectively performed on a particular condition. When the process is performed, one or more activation IDs of one or more activatable nodes might be changed. For this reason, the activation request node 100 notifies each of the activatable nodes of a new activation ID, using the communication interface 101 (procedure 504). For example, suppose if an activation ID of the activatable node 200 has been changed. The activatable node 200 receives a new activation ID from the activation request node 100 using the communication interface 201. The activatable node 200 updates the old activation ID stored in, for example, the database that the activation ID reception unit 205 can access. The sequence of FIG. 6 is completed upon the completion of procedure 503 or 504.

At the time when the activation ID generation unit re-determines an activation ID, the activatable node for which the activation ID has been changed may be in the non-activated state. In other words, it may be difficult to notify some of the activatable nodes of new activation IDs immediately. Accordingly, the activation request node 100 may perform procedure 504 for the activatable node in the non-activated state by following the policy ($\alpha$ or $\beta$ below.

Policy $\alpha$ is to notify a new activation ID immediately. In other words, the activation request node 100 remotely activates a desired activatable node using an old activation ID, then notifies a new activation ID. Policy $\beta$ is to hold notification of a new activation ID pending. More specifically, the activation request node 100 does not remotely activate an activatable node only for the reason of change in an activation ID; rather, the activatable node which needs to be notified of a new activation ID, and a new activation ID are temporarily stored in, for example, a database. Then, the activation request node 100 notifies the desired activatable node of a new activation ID when the desired node is activated by an old activation ID through carrying out of the sequence shown in FIG. 5. In the present embodiment, either policy $\alpha$ or $\beta$, or a different policy may be adopted. However, it should be noted that policy $\beta$ excels in reducing the number of times the activatable node is activated, and thus, can achieve better efficiency in a communication system.

Under policy $\beta$, as notification of a new activation ID is kept pending temporarily, collision of activation IDs may temporarily occur. In other words, the old activation ID for a first activatable node may match the new activation ID for a second activatable node. To avoid such collision of activation IDs, the above policy $\beta$ may be revised. Specifically, the notification of the new activation ID to the second activatable node can be held until the new activation ID is notified to the first activatable node. If the first activatable node is a node which is frequently activated, negative influence caused by not notifying the second activatable node of the new activation ID soon can be reduced.

The details of activation ID determination algorithm will be described below. This determination algorithm is carried out in procedure 304 of FIG. 4 (and procedure 503 of FIG. 6) by the activation ID generation unit 104 of the activation request node 100.

The basic policy of the determination algorithm for the activation ID assignment is as follows. The first policy is to assign a short activation ID for an activatable node which is evaluated as a node which is activated more frequently. The second policy is to assign a short activation ID for an activatable node which is evaluated as a node at which communication errors occur more frequently. According to the first and second policy, bit lengths of activation IDs are optimized throughout the communication system. In other words, as an activatable node which is more frequently activated uses a short activation ID, power consumption of the communication system as a whole can be reduced. Also, as an activatable node in which a communication error occurs more frequently uses a short activation ID, it becomes easy to avoid activation failure due to a communication error in the communication system as a whole. The third policy is not to consider sequence of bit values (0 and 1) consisting of an activation ID specially.

The determination algorithm is realized by the following first to fourth steps. At the first step, the activation ID generation unit 104 of the activation request node 100 inputs activation associated information collected by the activation associated information collection unit 103. The activation associated information is stored in, for example, a database accessible for the activation associated information collection unit 103 and the activation ID generation unit 104. The activation ID generation unit 104 calculates assignment priority for each activatable node based on the activation associated information input at the first step (second step). The details of the assignment priority will be described later. The activation ID generation unit 104 determines a bit length of an activation ID to be assigned to each activatable node based on a step increment parameter, which will be described later, and the assignment priority calculated at the second step (third step). The activation ID generation unit 104 determines a value of an activation ID to be assigned to each activatable node in accordance with the bit length determined at the third step (fourth step).

The detail of the activation associated information with respect to the first step is described below. The activation associated information input at the first step can be roughly divided into information related to frequency of activation requests to an activatable node and information related to frequency of communication errors in an activatable node. At the first step, either one of information may be input. The information related to frequency of activation requests may include predicted activation frequency information, activatable node type information and the number of times of activation in the past, for example. The information related to frequency of communication errors may include radio signal intensity information, physical position information, reception sensitivity at an activation signal reception interface and the number of communication errors in the past, for example. Of course, the activation ID generation unit 104 may input some of the information listed above, or a combination of the above-listed information and unlisted information.

The predicted activation frequency information directly indicates a predicted value of activation frequency for an activatable node. If a home network is supposed as a communication system, the value can be set by an equipment supplier of an activatable node, or by a user after purchase of an activatable node.

Activatable node type can be utilized to predict activation frequency of an activatable node. If a home network is presumed as a communication system, a television, a video recorder, or a personal computer is designated as an activatable node type. If the type is a television, it can be predicted that the activatable node is activated for a several times a day. On the other hand, an activatable node type is a DVD recording drive, it can be predicted that the activatable node is not very often activated. In short, it is possible to convert an activatable node type to activation frequency information (for example, the number of times of activation per year). Such conversion may be realized by constructing a database for mapping on the Internet and referring to the database by the activation ID generation unit 104. The result of conversion of the activatable node type may be treated independently from the aforementioned predicted activation frequency information, or may be integrated through averaging.

The number of times of activation in the past may be used to evaluate the activation frequency in the past for the activatable node. For example, the activation associated information collection unit 103 of the activation request node 100 can collect the number of times of activation in the past by managing the activation history of the activatable node. The number of times of activation in the past increases as the time elapsed since the activatable node has been added to the communication system becomes longer. For example, if the number of times of activation in the past is divided by the elapsed time since the addition of a node to the system, it would be easy to evaluate a more reasonable value.

The signal intensity information is collected by the activation associated information collection unit 103 of the activation request node 100 in, for example, procedure 303 of FIG. 4. It can be predicted that as the signal intensity increases the frequency of communication error at the activatable node becomes less.

The physical position information indicates a physical relative distance between the activation request node 100 and an activatable node. The longer the physical relative distance, the more frequently a communication error occurs at an activatable node. The physical position information may be detected by a position sensor of the activation request node 100 or an activatable node, or may be manually set by a user after setting those nodes.

Reception sensitivity at an activation signal reception interface is an indicator of a reception ability of the activation signal reception interface of an activatable node. Specifically, it can be predicted that the lower the reception sensitivity is, the more frequently a communication error occurs at an activatable node.

The number of times a communication error occurred in the past can be used to evaluate the frequency of communication error in the past at an activatable node. For example, the activation associated information collection unit 103 of the activation request node 100 counts the number of times an activatable node was not activated regardless of an activation request signal transmitted by the activation ID transmission unit 105 from the activation signal transmission interface 102, in order to collect the number of communication error occurrences in the past. Or, the activation associated information collection unit 103 may collect the number of times communication error occurs in a communication using the communication interface 101 as the number of times a communication error occurred in the past. The activation associated information collection unit 103 counts the number of times an activation request signal was retransmitted in the past, and collects it as the number of times a communication error has occurred. The number of times an activation request signal was retransmitted in the past increases as the number of time an activation request occurred in the past increases. For example, if the number of times an activation request signal was retransmitted in the past is divided by the number of activation requests in the past, it is easy to evaluate a more reasonable value.

In the following, the details of assignment priority at the second step will be described. As described above, the activation associated information input at the first step is roughly classified into the information regarding frequency of activation requests to an activatable node and the information regarding frequency of communication errors at an activatable node. The activation ID generation unit 104 compiles the activation associated information into the activation frequency information and the error frequency information, and integrates both of the information to determine an assignment priority. If either one of the activation frequency information and the error frequency information is not collected, the activation ID generation unit 104 can determine an assignment priority based on the other information. The activation frequency information is an evaluation value of the frequency of activation requests to the activatable node, and the error frequency information is an evaluation value of the frequency of communication errors at an activatable node.

The activation frequency information is, for example, a statistic value of the activation frequency evaluated from plural points of view. For example, the activation ID generation unit 104 can calculate the activation frequency information by following Expression 1 below:

$$A = \frac{1}{2} * \left(\frac{C}{B} + D\right) \qquad (1)$$

In Expression 1, A represents activation frequency information. B represents time elapsed since an activatable node was added to the communication system, and C represents the number of times of activation in the past. Accordingly, C/B is a measured value of the activation frequency at an activatable node in the past. D represents a predicted activation frequency, i.e., an estimated value of the activation frequency at an activatable node. In Expression 1, an arithmetic mean of the measured value and the estimated value of the activation frequency are calculated; however, a weighted average of those values may be calculated, instead. A weight for the measured value may be increased as the length of the elapsed time since an activatable node was added to the system increases, for example, or the other strategy may be adopted to determine the weight.

The error frequency information is, for example, a statistic value of an error frequency evaluated from plural points of view. For example, the activation ID generation unit 104 calculates error frequency information by Expression 2 below:

$$E = \frac{1}{F} * \frac{1}{G} * H * \frac{J}{I} \qquad (2)$$

In Expression 2, E represents error frequency information. F represents signal intensity information, and G represents reception sensitivity information at the activation signal reception interface 202, and H represents physical position information. Accordingly, each of 1/F, 1/G, and H is an estimated value of error frequency at an activatable node. Also, in Expression 2, I represents the number of times an activation request occurred in the past, and J represents the number of times an activation request signal was retransmitted. Accordingly, J/I is a measured value of error frequency in the past at an activatable node. According to Expression 2, the error frequency information E becomes greater, as the radio signal intensity information F is less, the reception sensitivity information G is lower, and the physical position information H is greater, and the error frequency in the past is higher.

The activation ID generation unit 104 calculates an activation indicator value based on at least one of the activation frequency information A and the error frequency information E. Typically, the activation ID generation unit 104 calculates an activation indicator value by combining the activation frequency information A and the error frequency information E. For example, the activation ID generation unit 104 calculates an activation indicator value by Expression 3 below:

$$K = A * E \qquad (3)$$

In Expression 3, K represents an activation indicator value. According to Expression 3, the activation indicator value K becomes greater, as the activation frequency information A and the error frequency information E. The activation ID generation unit 104 can treat the activation indicator value K as an assignment priority. Or, the activation ID generation unit 104 can treat a probability (in the following explanation, referred to as "activation probability information") that is obtained by normalizing the activation indicator value K as an assignment priority. For example, the activation ID generation unit 104 calculates activation probability information by Expression 4 below:

$$P(x) = \frac{K_x}{\sum_{x=0}^{n} K_x} \qquad (4)$$

In Expression 4, P(x) represents activation probability information of an activatable node x. x is a variable integer to identify activatable nodes ($0 \leq x \leq n$, n=[total number of activatable nodes]−1). $K_x$ is an activation indicator value of an activatable node x. The sum of the activation probability information of all activatable nodes is 1. The activation probability information can be regarded as appearance frequency information in Huffman coding.

Figure 7:
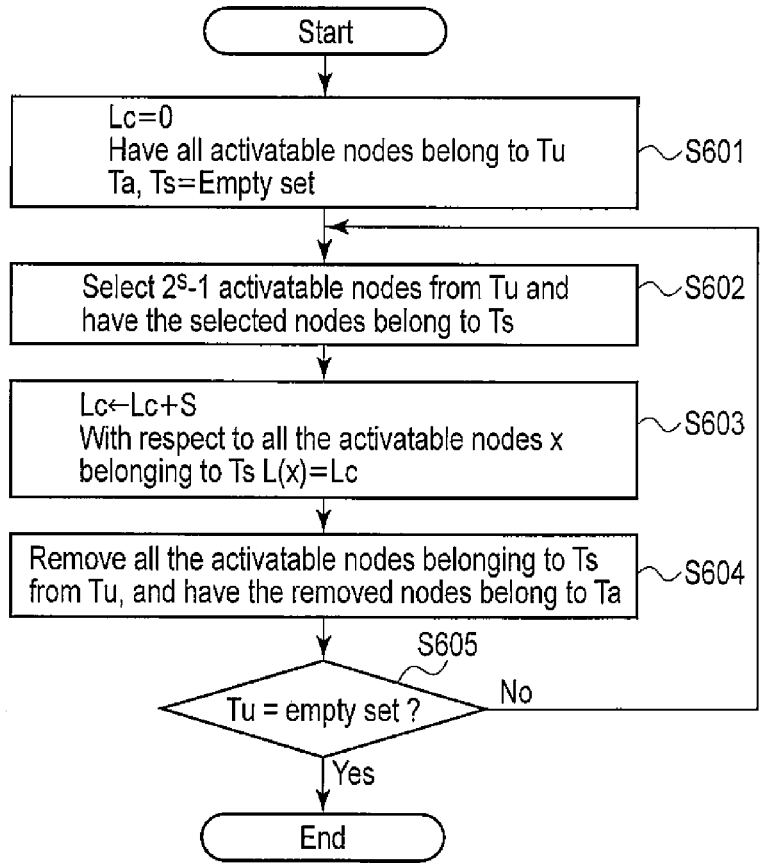
FIG. 7 is a flowchart showing a part of an activation ID determination algorithm.

In the following, regarding the third step of the determination algorithm, the determination of bit length of an activation ID to be assigned to each activatable node, with reference to FIG. 7. Specifically, the activation ID generation unit 104 regards the activation probability information as appearance frequency information in Huffman coding to determine a bit length (size) of an activation ID to be assigned to each activatable node. A step increment parameter S is a variable setting value, and indicates a unit (bit length) of increasing an activation ID bit length. In typical Huffman coding, a step increment parameter S=one bit; however, as will be described later, a step increment parameter S=two or more in the present embodiment. In other words, in typical Huffman coding, binary Huffman tree ($2=2^1$) is adopted; however, N-ary Huffman tree ($N=2^S$) is adopted in the present embodiment.

The process begins with step S601. In step S601, the activation ID generation unit 104 carries out initializing process. Specifically, first, the activation ID generation unit 104 substitutes 0 for a variable Lc, has all the activatable nodes belong to the set Tu, and sets each of the sets Ta and Ts as an empty set. Herein, the variable Lc represents a bit length of an activation ID. The set Tu includes activatable nodes to which no activation ID is assigned. The set Ta includes activatable nodes to which activation IDs have been assigned. The set Ts includes activatable nodes selected to assign activation IDs. The union of the set Ta and the set Tu is equal to the set of all the activatable nodes. After step S601, the process proceeds to step S602.

In step S602, the activation ID generation unit 104 selects $2^S-1$ activatable nodes from those belong to the set Tu, and has the selected activatable nodes belong to the set Ts. Specifically, the activation ID generation unit 104 selects $2^S-1$ activatable nodes from the set Tu in the descending order of activation probability information (i.e., assignment priority). If the number of activatable nodes in the set Tu is less than $2^S-1$, the activation ID generation unit 104 selects all the activatable nodes in the set Tu.

Subsequently, the activation ID generation unit 104 increments the variable Lc by a step of S, and in step S602, the unit assigns L(x)=Lc to all the activatable nodes in the set Ts (step S603). Herein, L(x) represents a bit length of an activation ID assigned to the activatable node x. In other words, in step S603, the same bit length (=Lc) is assigned to $2^S-1$ activatable nodes at maximum.

After step S603 is completed, the activation ID generation unit 104 removes all the activatable nodes belonging to the set Ts from the set Tu, and has all those nodes belong to the set Ta (step S604). If the set Tu becomes an empty set as a result of step S604, the process is completed; if the set Tu does not become an empty set, the process returns to step S602 (step S605).

In the following, the details of a value of an activation ID to be assigned to each activatable node, with respect to the fourth step. As is apparent from the third policy described above, a value of an activation ID can be assigned based on any method. For example, a small bit value can be assigned in the descending order of the activation probability information (i.e., assignment priority) for activatable nodes having activation IDs of the same bit length. A value of activation ID to be assigned to each activatable node varies in accordance with a value of the step increment parameter S above.

For example, if the step increment parameter S=one bit, the minimum bit length of an activation ID is one bit and the maximum number of activation IDs having the same bit length is one ($=2^1-1$). A value of the activation ID is, for example, "0," "10," "110," etc.

For example, if the step increment parameter S=two bits, the minimum bit length of an activation ID is two bits and the maximum number of activation IDs having the same bit length is three ($=2^2-1$). A value of the activation ID is, for example, "00," "01," "10," "1100," "1101," "1110," "111100," "111101," "111110" etc.

For example, if the step increment parameter S=three bits, the minimum bit length of an activation ID is three bits and the maximum number of activation IDs having the same bit length is seven ($=2^3-1$). A value of the activation ID is, for example, "000," "001," "010," "011," "100," "101," "110," "111000," "111001," "111010," "111011," "111100," "111101," "111110," etc.

For example, if the step increment parameter S=four bits, the minimum bit length of an activation ID is four bits and the maximum number of activation IDs having the same bit length is 15 ($=2^4-1$). A value of the activation ID is, for example, "0000," "0001," "0010," "0011," "0100," "0101," "0110," "0111," "1000," "1001," "1010," "1011," "1100," "1101," "1110," "11110000," 11110001," 11110010," "11110011," "11110100," "11110101," "11110110," "11110111," "11111000," 11111001," "11111010," 11111011," 11111100," "11111101," "11111110," etc.

According to the aforementioned determination algorithm, the higher the frequency of activation request to an activatable node is evaluated, the shorter the activation ID is assigned, the higher the frequency of communication errors at an activatable node is evaluated, the shorter activation ID is assigned. Accordingly, the bit lengths of activation IDs are optimized throughout the communication system. In other words, since an activatable node that is frequently activated uses a shorter activation ID, the power consumption of whole communication system can be reduced. In addition, since an activatable node at which a communication error frequently occurs uses a shorter activation ID, it becomes easier to avoid failure of activation due to communication errors in whole communication system. Moreover, theoretically, the determination algorithm does not limit the number of assignable activation IDs (in other words, a bit length of an activation ID is not limited). Accordingly, this determination algorithm is applicable to any communication system regardless of the numbers of the activatable nodes included therein.

In the following, the details of the process of transmitting an activation request signal will be described. As described above, it is assumed that an activation request signal includes an activation ID which is a variable length code word and is transmitted wirelessly. For this reason, the activation signal transmission unit 105 of the activation request node 100 applies the process considering the following matters, so that the occurrence frequency of communication errors can be reduced:

(1) a wireless coding which makes it easy to distinguish no-signal condition should be adopted;

(2) measurements to deal with bit error (or bit dropping) due to radio interference should be taken; and (3) measurements to deal with noise addition to the end (or beginning) of an activation request signal should be taken.

Figure 8A:
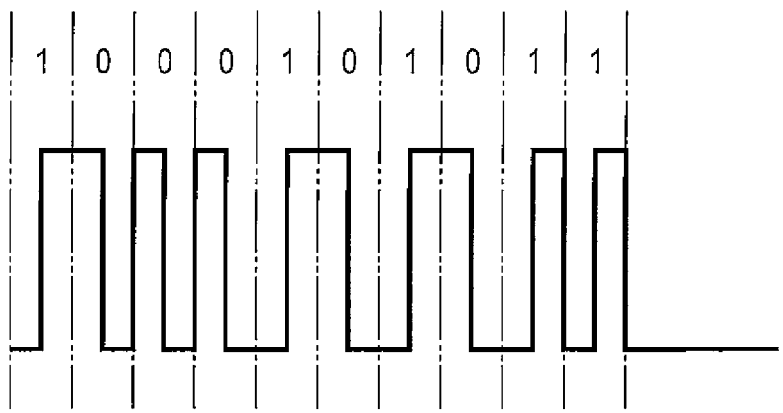
FIG. 8A is an exemplary drawing of a signal format of Manchester encoding.

Regarding (1) above, if no-signal condition cannot be distinguished, a bit length of a received activation ID cannot be specified at the activatable node, and that might result in failure of activation or improper activation. As a wireless coding scheme to distinguish no-signal condition from the binary-1 transmission status and the binary-0 transmission status at the receiver end, Manchester coding (binary pulse position modulation [PPM]) is known, for example. As shown in FIG. 8A, according to Manchester coding, a pulse is transferred from low to high in the binary-0 transmission status, and a pulse is transferred from high to low in the binary-1 transmission status. According to Manchester coding, it is possible to distinguish among no-signal condition, the binary-1 transmission status, and the binary-0 transmission status. The activation signal transmission unit 105 may, of course, adopt a different wireless coding scheme, and select a wireless coding scheme regardless of the above (1).

Figure 8B:
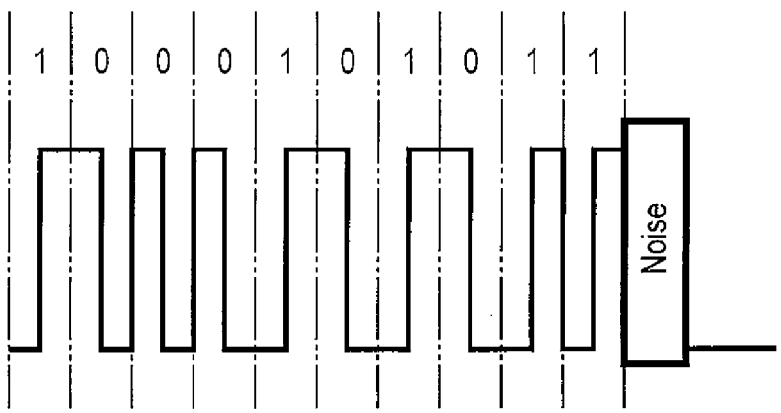
FIG. 8B shows an example of effect of increasing a bit length of an activation ID by a step of 2 or more bits.
Figure 8C:
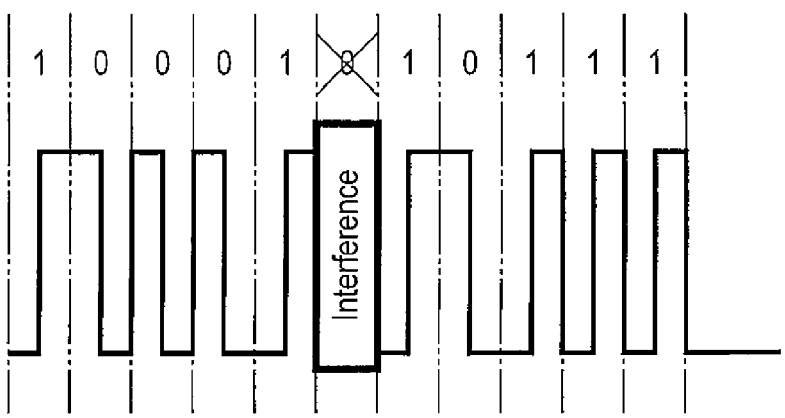
FIG. 8C shows an example of effect of adding a parity bit.

Regarding (2), if an error bit (or a dropped bit) cannot be corrected, a wrong activation ID is detected at an activatable node, and may result in failure of activation or improper activation. To correct errors, a parity bit can be added, for example. According to the aforementioned Manchester coding, theoretically no bit errors occur; however, a bit may be dropped because of radio interference. If one-bit parity is added, a single dropped bit can be restored. For example, if one-bit even parity is added to an activation ID and Manchester coding is performed on the activation ID, a single dropped bit can be restored, as shown in FIG. 8C. In other words, if a total of the bits except for dropped bit is an odd number, the dropped bit is restored as binary 1, and if an even number, the dropped bit is restored as binary 0.

Figures 9A, 9B, 10:
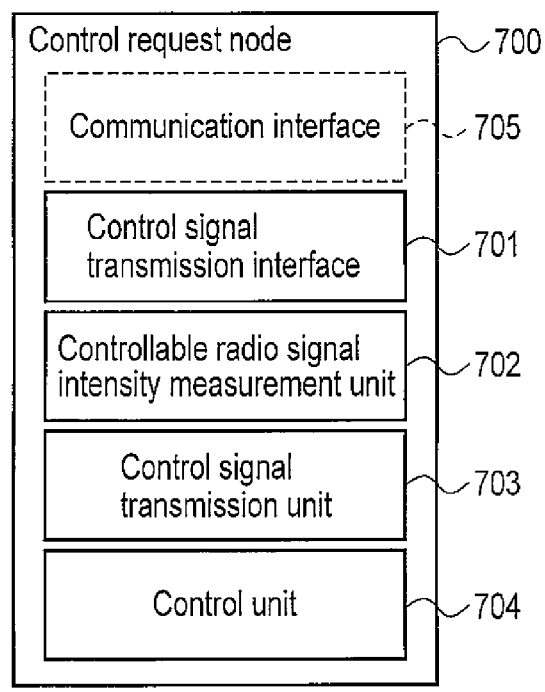
FIG. 9A shows an example of adding a parity bit to an activation ID of 12 bits.
FIG. 9B shows an example of adding a parity bit to an activation ID of 18 bits.
FIG. 10 is a block diagram showing a control request node according to the second embodiment.

Further regarding (2), it is also possible to measure the dropping of more than one bit. By adopting an interleaving scheme and adding more parity bits, multiple dropped bits can be restored. For example, as shown in FIG. 9A, if a 12-bit activation ID is interleaved in units of four bits, and one-bit parity is added to each four-bit group, it is possible to restore one dropped bit for each group. In FIGS. 9A and 9B, the numbers indicate the order of transmitting the bits, and the parity bits (for example 5, 10, 15 in FIG. 9A) are circled.

It was found from actual measurement that if a ratio of a bit length of parity bits to a bit length of an activation ID is fixed, the greater the bit length of the activation ID becomes, the greater the occurrence frequency of communication errors. Thus, it is desirable to add parity bits as a higher ratio as a bit length of an activation ID increases. Accordingly, the activation ID transmission unit 105 adopts a smaller interleaving unit as a bit length of an activation ID increases, so that increase of occurrence frequency of communication errors can be reduced. For example, the activation ID transmission unit 105 interleaves 12-bit activation ID in units of four bits (see FIG. 9A), and 18-bit activation ID in units of three bits (see FIG. 9B). According to the example of FIGS. 9A and 9B, three-bit parity is added to a 12-bit activation ID, and six-bit parity is added to an 18-bit activation ID. Hence, as the bit length of the activation ID increases, the ratio of parity bit in an activation request signal increases, thereby reducing increase of occurrence frequency of communication errors effectively.

Regarding (3) above, if noise is added to the end (or beginning) of an activation request signal, similarly to (1), a bit length of a received activation ID cannot be specified at an activatable node; consequently, failure of activation or improper activation may occur. If a bit length of an activation ID is increased by a step of one bit, for example, the bit length of the received activation ID cannot be specified only by adding noise to the trailing (or leading) bit of the activation request signal, as shown in FIG. 8B. On the other hand, if the bit length of an activation ID is increased by a step of two bits (i.e., the above-described step increment parameter S is set at more than two bits), the bit length of the activation ID can be correctly detected even when noise is added to the beginning or end which is shorter than the step at the received activation ID.

If the process considering (1), (2) and (3) above, it is possible to detect a bit length of a received activation ID can be correctly detected and to correct an error bit or a dropped bit. As a result, occurrence frequency of communication errors can be effectively reduced, and failure of activation and improper activation due to communication errors can be easily avoided.

As explained above, the activation request node according to the first embodiment assigns an activation ID in a manner such that the higher at least one of the occurrence frequency of activation request and the occurrence frequency of communication errors is, the shorter an bit length of an activation ID is assigned. Therefore, according to the activation request node of the present embodiment, bit lengths of activation IDs are optimized in whole communication system. If a short activation ID is assigned to an activatable node which is frequently activated, power consumption in whole communication system can be reduced. Moreover, if a short activation ID is assigned to an activatable node at which a communication error frequently occurs, it becomes easier to avoid failure of activation due to communication errors in whole communication system.

In addition, the activation request node according to the present embodiment does not limit the number of assignable activation IDs (in other words, a bit length of an activation ID is not limited). Thus, according to the activation request node of the present embodiment, it is possible to perform remote control individually on activatable nodes, regardless of the number of activatable nodes included in the communication system.

Furthermore, the activation request node of the present embodiment adopts a wireless coding scheme to distinguish no-signal condition, such as Manchester coding, and increases a bit length of an activation ID by a step of two or more bits. Thus, according to the activation request node of the present embodiment, the activatable node can detect a bit length of an activation request signal which includes an activation ID that is variable length code word and is radio-transmitted. The activation request node of the present embodiment interleaves, for example, an activation ID, and adds a parity bit for each interleaved bit group in order to correct errors. Specifically, the activation request node of the present embodiment decreases the unit of interleaving as the bit length of an activation ID increases, so that the ratio of parity bits in an activation request signal increases. Thus, according to the activation request node of the present embodiment, it is possible to effectively reduce increase of occurrence frequency of communication errors due to the increase of a bit length of an activation ID.

Furthermore, the activation request node 100 of FIG. 1 can be implemented as more than two communication apparatuses by dividing its functions. For example, the activation request node 100 of FIG. 1 can be implemented as a first communication apparatus and a second communication apparatus. The first and second communication apparatuses can exchange information. More specifically, the first communication apparatus includes at least the activation ID generation unit 104, and inputs activation associated information in procedure 304 of FIG. 4 (and procedure 503 of FIG. 6), and generates an activation ID based on the information. The activation associated information input by the first communication apparatus may be information collected by the second communication apparatus or other external communication apparatuses, or by the first communication apparatus itself. The second communication apparatus includes at least the activation signal transmission interface 102, and transmits an activation request signal including the activation ID generated by the first communication apparatus to activate an activatable node remotely.

(Second Embodiment)

The explanation of the first embodiment above was mainly on the remote activation of controllable nodes. In contrast, the explanation of the second embodiment will be more general, not limiting to a specific type of remote control. In other words, the second embodiment can be applied to various remote control (including remote activation) carried out based on a designated control ID.

In the present embodiment, unlike the first embodiment, the total number of assignable control IDs is limited. In the present embodiment, if the total number of controllable nodes included in a communication system excesses the total number of assignable control IDs, a common control ID is forced to assign to more than one controllable node. Consequently, even when a common control ID is assigned to more than one controllable node, a control request node according to the present embodiment achieves individual remote control on each desired controllable nodes by using a controllable radio intensity (will be described later) in combination with the control ID.

The control request node and the controllable node according to the present embodiment may or may not be connected to the network shown in FIG. 3 in a manner similar to the first embodiment. In other words, the control request node and the controllable node according to the present embodiment may exchange information without using, for example, an IP network.

As shown in FIG. 10, the control request node 700 according to the present embodiment includes a control signal interface 701, a controllable radio signal intensity measurement unit 702, a control signal transmission unit 703, a control unit 704, a communication interface 705. The control request node 700 according to the present embodiment can control remotely the controllable node according to the present embodiment (for example, a controllable node 800), as will be described later.

The control signal interface 701 performs wireless communication using a control ID. More specifically, the control signal interface 701 is used to transmit a search signal, a disregard request signal, or a control request signal, which will be described later. Also, the control signal interface 701 is used to measure a controllable radio signal intensity which will be described later. Further, the control signal interface 701 may be used to receive some or all of various response signals from a controllable node, to transmit an ID assignment start signal (will be described later) from a controllable node, or to transmit a control ID assignment signal (will be described later) from a controllable node.

The controllable radio signal intensity measurement unit 702 measures controllable radio signal intensity. Specifically, the controllable radio signal intensity measurement unit 702 measures controllable radio signal intensity at each controllable node, using the control signal transmission unit 703 and the communication interface 705, and generates a controllable node list which associate the controllable radio signal intensity with a controllable node corresponding to the intensity, and stores the node list in, for example, a database.

The control signal transmission unit 703 transmits various control signals to the controllable node, using the control signal interface 701. The operation of the control signal transmission unit 703 is controlled by the control unit 704 and the controllable radio signal intensity measurement unit 702.

The control unit 704, as will be described later, assigns a control ID to a controllable node, controls a controllable node remotely based on the control ID and the controllable radio signal intensity, and controls the whole control request node 700.

The communication interface 705 may be a wireless LAN interface, like the communication interface 101 of FIG. 1, or any interface that supports other communication schemes. For example, the communication interface 705 performs communication using an IP address or a MAC (media access control) address. The communication interface 705 may be used to receive a part or all of various response signals from a controllable node, to transmit an ID assignment start signal to a controllable node, and to transmit a control ID assignment signal to a controllable node. However, the communication interface 705 is optionally provided at the control request node 700. In other words, the communication interface 705 may be removed from the control request node 700.

The control request node 700 may include constituent elements not shown in FIG. 10. For example, the control request node 700 may include a functional unit to receive a request to transmit a control request signal to a specific controllable node from other node (it can be called "a request reception unit," for example) and a functional unit to use an application of a controllable node via a network with a control request signal (it can be called "an application execution unit," for example).

As shown in FIG. 11, the controllable node 800 according to the present embodiment includes a control signal interface 801, a measurement response unit 802, a control signal reception unit 803, and a control unit 804, and a communication interface 805. The controllable node 800 receives various control signals from the control request node 700 and operates in accordance with these received control signals. In a communication system, other controllable nodes also have the structure the same or similar to that of the controllable node 800.

The control signal interface 801 performs a wireless communication using a control ID. Specifically, a control signal interface 801 is used to receive search signals, disregard request signals, and control request signals. The control signal interface 801 is used to measure a controllable radio signal intensity which will be described later. Further, the control signal interface 801 is used to transmit some or all of various response signals to the control request node 700, to receive an ID assignment start signal from the control request node 700, and to receive a ID assignment signal from the control request node 700.

The measurement response unit 802 responds to the measurement of controllable radio signal intensity performed by the control request node 700. More specifically, the measurement response unit 802 receives a search signal from the control request node 700 and transmits a response signal back, using the control signal interface 801, the control signal reception unit 803, and the communication interface 805.

The control signal reception unit 803 receives various control signals from the control request node 700, using the control signal interface 801. The operation of the control signal reception unit 803 is controlled by the control unit 804 and the measurement response unit 802. The control signal reception unit 803 supplies a received control signal to the measurement response unit 802 or the control unit 804.

The control unit 804 controls the operation of the controllable node 800 in accordance with various control signals from the control request node 700.

The communication interface 805 may be a wireless LAN interface similar to the interface 201 of FIG. 2, or may be any interface that supports other communication schemes. For example, the communication interface 805 performs a communication using an IP address or a MAC address. The communication interface 805 may be used to transmit a part or all of various response signals to the control request node 700, to receive an ID assignment start signal from the control request node 700, and to transmit a control ID assignment signal from the control request node 700. However, the communication interface 805 is optionally provided at the controllable node 800. In other words, the communication interface 805 may be removed from the controllable 800.

The controllable node 800 may include constituent elements not shown in FIG. 11. The controllable node 800 may include a functional unit to have other nodes use a local application via a network (it can be called "an application execution unit," for example).

As a preparation stage to enable the control request node 700 to control a controllable node remotely, controllable radio signal intensity at each controllable node is measured and a control ID is assigned to each controllable node based on the measured controllable radio signal intensity. It should be noted that these processing may be carried out only when initializing the communication system, or may be carried out again in order to update the controllable radio signal intensity and the control ID.

Figure 12:
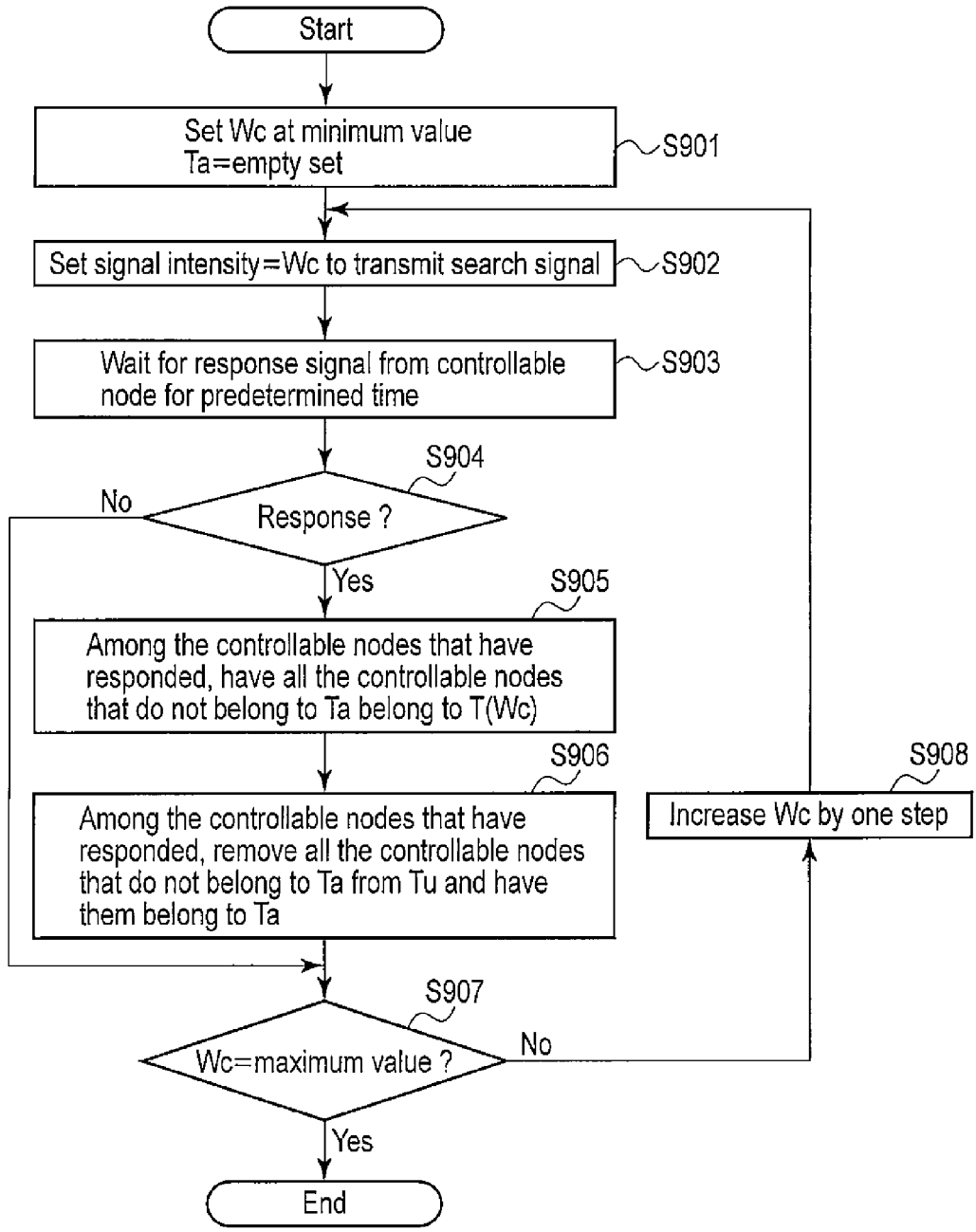
FIG. 12 is a flowchart showing a process of measuring controllable radio signal intensity.

The measurement of controllable radio signal intensity is carried out in a manner shown in, for example, FIG. 12. The process shown in FIG. 12 begins with step S901. In step S901, the controllable radio signal intensity measurement unit 702 of the control request node 700 performs initial processing. Specifically, the controllable radio signal intensity measurement unit 702 sets a variable Wc at a minimum value and a set Ta as an empty set. The variable Wc represents signal intensity. The minimum value for the variable Wc may be a minimum value configurable in a communication system, or may be a value that is set by a user. The set Ta includes the controllable node whose controllable radio signal intensity has already been measured. After the completion of step S901, the process proceeds to step S902.

In step S902, the controllable radio signal intensity measurement unit 702 sets the signal intensity of the control signal transmission unit 703 at Wc, and the control signal transmission unit 703 transmits a search signal using the control signal interface 701. Then, the control request node 700 waits for a response signal from the controllable node in response to the search signal transmitted at the step S902 for a predetermined time (step S903). In other words, the controllable node is configured to send a response signal when receiving a search signal. The response signal in response to the search signal may be received using the control signal interface 701 or the communication interface 805. The response signal includes information to identify the controllable node which transmits the response signal (e.g., MAC address, IP address, etc.). Further, the response signal may include passphrase information to match the search signal transmitted in step S902 with the response signal and reception intensity information on the received search signal. If any response is received from any of the controllable nodes as a result of the wait in step S903, the process proceeds to step S905, if not, to step S907.

In step S905, the controllable radio signal intensity measurement unit 702 refers to the identification information included in the received response signal to identify the controllable node which transmits the response signal. The controllable radio signal intensity measurement unit 702 has all the specified controllable nodes that do not belong to the set Ta belong to a set T(Wc). The set T(W) includes controllable nodes at which a controllable radio signal intensity=W. The controllable radio signal intensity measurement unit 702 removes all the specified controllable nodes that do not belong to the set Ta from the set Tu, and has those removed controlled target nodes belong to the set Ta (step S906), and the process proceeds to step S907. The set Tu includes controllable nodes for which controllable radio signal intensity is not measured.

In step S907, the controllable radio signal intensity measurement unit 702 determines if the variable Wc is at a maximum value or not. The maximum of the variable Wc may be a maximum value that is configurable at the communication system, similarly to the minimum value, or may be a value that is set by a user. If the variable Wc is at a maximum value, the process is completed; if not, the process proceeds to step S908. When the process of FIG. 12 is completed, all the controllable nodes in the communication system do not always belong to the set Ta (i.e., the set Tu is an empty set). In other words, measuring controllable radio signal intensity may have not yet finished for some of the controllable nodes. A controllable node for which the measurement of controllable radio signal intensity has not finished cannot be controlled by the control request node 700. Therefore, the control request node 700, regardless of existence of such nodes in the communication system, carries out remote control of controllable nodes (i.e., controllable nodes listed in the controllable node list which will be described later).

In step S908, the controllable radio signal intensity measurement unit 702 increases the variable Wc by one step, then, the process returns to step S902. The increment of the variable Wc in step S902 may be a minimum unit that is controllable in the communication system, or may be a value that can be set by a user.

As a result of the process shown in FIG. 12, minimum signal intensity that can control each controllable node is measured as controllable radio signal intensity. It should be noted that the controllable radio signal intensity is quantized by the increment of the variable Wc that is used in step S908. The controllable radio signal intensity measurement unit 702 generates a controllable node list which looks like the list shown in FIG. 13. The controllable node list in FIG. 13 shows a correspondence between a level of the controllable radio signal intensity (1, 2, 3, 4) and identification information of a corresponding controllable node (R0, . . . , R9). Typically, an MAC address, etc. is described as identification information Rx.

At the process of FIG. 12, controllable radio signal intensity is measured by increasing signal intensity from a minimum value to a maximum value gradually. However, it is also possible to measure controllable radio signal intensity by reducing signal intensity from a maximum value to a minimum value gradually. With such a procedure, controllable radio signal intensity is measured based on a maximum signal intensity at which a response signal cannot be received for each controllable node.

After measuring controllable radio signal intensity, assignment of control ID is performed as shown in FIG. 14. Typically, the assignment of the control ID follows the measurement of controllable radio signal intensity; however, the assignment and the measurement can be performed separately, depending on instructions from an application, for example.

The process of FIG. 14 begins with step S1001. The control unit 704 of the control request node 700 performs initializing process. Specifically, the control unit 704 matches the set Tu with the set T, and sets the set Ta as an empty set. The set T includes controllable nodes listed in the controllable node list. The set Tu includes controllable nodes to which a control ID is not assigned among the controllable nodes that belong to the set T. The set Ta includes controllable nodes to which a control ID has been assigned among the controllable nodes that belong to the set T. The union of the set Tu and the set Ta is equal to the set T. When step S1001 is completed, the process proceeds to step S1002. Step S1002 is optional, and thus, it can be omitted. In other words, the process may proceed to step S1003 after step S1001.

In step S1002, the control unit 704 transmits an ID assignment start signal to the controllable nodes that belong to the set T. The ID assignment start signal may be transmitted using the control signal interface 701 or the communication interface 705. However, when the ID assignment start signal is transmitted using the control signal interface 701, it is necessary to set signal intensity that can reach the controllable nodes belonging to the set T (for example, a maximum controllable radio signal intensity in the controllable node list). When the ID assignment start signal is transmitted using the communication interface 705, the signal can be broadcasted or multicasted. After step S1002, the process proceeds to step S1003.

The controllable node operates upon the receiving of the ID assignment start signal. For example, the controllable node carries out preparation for setting a control ID (changing an operation mode, etc.). Further, when the controllable node receives a control ID assignment signal after the preparation, the controllable node sets a control ID in accordance with control ID assignment signal.

In step S1003, the control unit 704 performs assignment of control ID. Specifically, the control unit 704 selects lm controllable nodes from the set Tu in the ascending order of the controllable radio signal intensity. The number lm is equal to the total number of the assignable control IDs. If the total number of the controllable nodes in the set Tu is less than lm, the control unit 704 selects all the controllable nodes in the set Tu. Then, the control unit 704 assigns a control ID for each of the selected controllable nodes. Here, if the control ID has a fixed length, the control unit 704 can assign a control ID in accordance with an arbitrary procedure. If the control ID has a variable length, the control unit 704 may assign a control ID using the first embodiment; however, it is unnecessary to use the first embodiment. The control unit 704 stores control IDs in association with controllable nodes in, for example, a database.

The control unit 704 transmits a control ID assignment signal to the controllable nodes selected in step S1003. The control ID assignment signal is used to notify a control ID assigned to each controllable node. The control ID assignment signal may be transmitted using either the control signal interface 701 or the communication interface 705. However, it should be noted that in case of transmitting the control ID assignment signal using the control signal interface 701, a signal intensity that can reach a controllable node to which the signal is transmitted (for example, controllable radio signal intensity corresponding to the controllable node to which the signal is transmitted) should be set. In case of transmitting the control ID assignment signal using the communication interface 705, an MAC address or IP address of the controllable node to which the signal is transmitted can be designated. The controllable node is configured to set a control ID upon receiving a control ID assignment signal. After step S1004, the process proceeds to step S1005.

In step S1005, the control unit 704 removes all the controllable nodes selected in step S1003 from the set Tu, and have all those nodes belong to the set Ta. If the set Tu becomes an empty set as a result of step S1005, the process is completed, and if not, the process proceeds to step S1007.

In step S1007, the control unit 704 allows reusing of control ID. In other words, in order to assign some or all of the control IDs assigned at the preceding step S1003 for a controllable node to which a control ID has not been yet assigned, the process returns to step S1003. In the example of FIG. 14, the reusing of control IDs is realized by iterating step S1003. If step S1003 is iterated, it is possible to achieve increasing a difference of the controllable radio signal intensity between the controllable nodes that use the same control ID. In other words, as will be described later, it will become easy to realize individual remote control based on a difference of the controllable radio signal intensity between the controllable nodes that use the same control ID. Reusing of the control ID may be carried out by a process that is not shown, different from step S1003.

Figure 15:
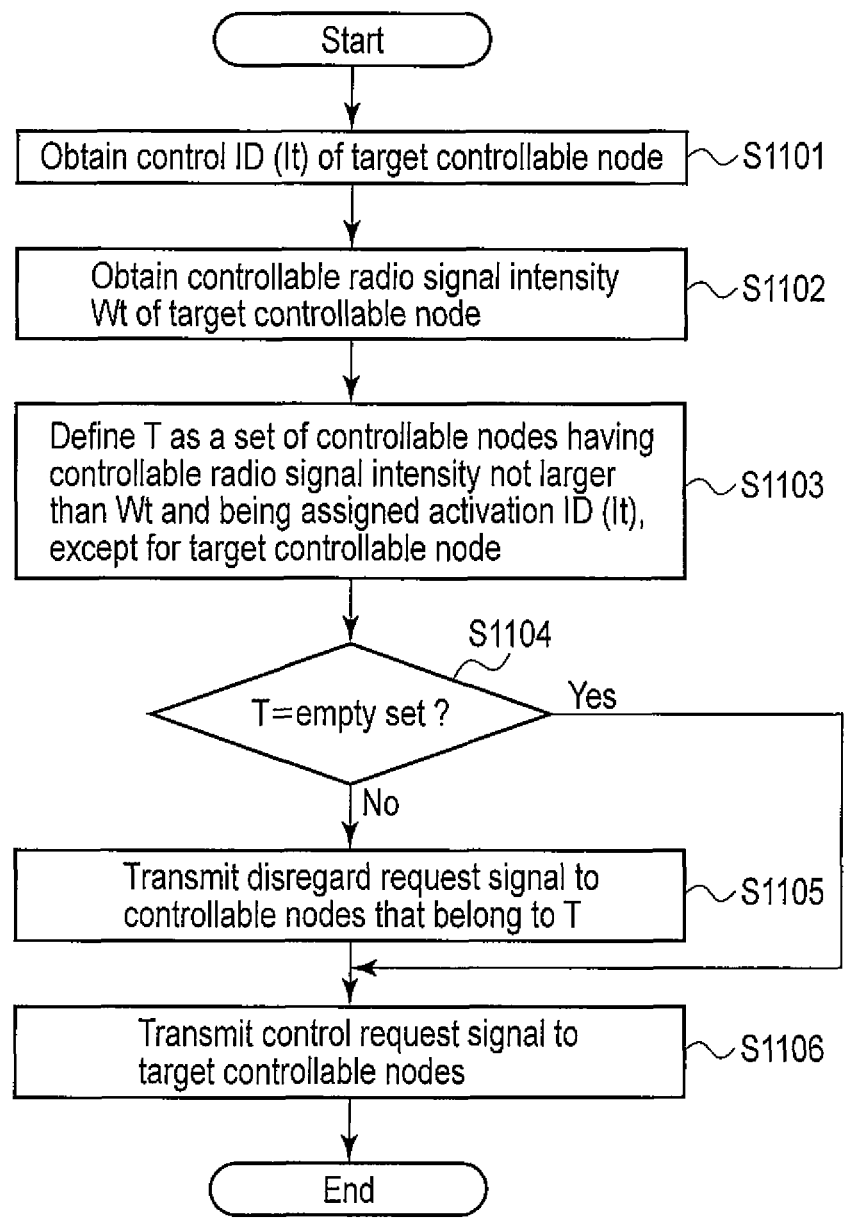
FIG. 15 is a flowchart of a process of remote control of controllable node individually.

As a result of the process of FIG. 14, the control ID is assigned to all the controllable nodes listed in the controllable node list. As mentioned above, however, when the total number of controllable nodes listed in the controllable node list is greater than lm, some or all of the control IDs are reused; as a consequence, there is a collision of control IDs. Thus, as shown in FIG. 15, the control request node 700 carries out remote control on a desired controllable node individually based on the control ID and the controllable radio signal intensity. Typically, when the control request node 700 receives a request from, for example, an application to control a specific controllable node (hereinafter, referred to as "target controllable node"), the process of FIG. 15 begins. The control request includes information to identify a target controllable node (e.g., MAC address) and a control command. The control command may include information of a type of control and details of the control.

The process of FIG. 15 begins with step S1101. In step S1101, the control unit 704 obtains a control ID (It) of a target controllable node. The control ID (It) is assigned to the target controllable node in advance through the process of FIG. 14, and is stored in the database. Typically, the control unit 704 obtains the control ID (It) of the target controllable node by referring to the database using the identification information of the target controllable node as a key.

The control unit 704 obtains controllable radio signal intensity Wt of the target controllable node (step S1102). The controllable radio signal intensity Wt is measured in advance through the process of FIG. 12, for example, and is described in the controllable node list. Typically, the control unit 704 obtains the controllable radio signal intensity Wt of the target controllable node by referring to the controllable node list using the identification information of the target controllable node as a key.

After step S1101 and step 1102, the control unit 704 prepares the set T by referring to the database storing the correspondence between the controllable nodes and the control IDs and the controllable node list (step S1103). Specifically, the control unit 704 has all the controllable nodes (except for target controllable node) that have controllable radio signal intensity not larger than Wt and to which a control ID (It) is assigned belong to the set T.

If the set T is an empty set, the process proceeds to step S1106; if not, the process proceeds to step S1105 (step S1104). When the set T is an empty set, even if controllable radio signal intensity Wt is set and a control request signal including a control ID (It) is transmitted, controllable nodes other than the target controllable node would not respond to the control request signal. Theoretically, control IDs which are different from the control ID (It) are assigned to all of the controllable nodes (except for the target controllable node) that the control request signal reaches. Also, theoretically, the request control signal does not reach the controllable nodes (except for the target controllable node) to which the control ID (It) is assigned. On the other hand, theoretically, when the set T is not an empty set, the control ID (It) is assigned to some of the controllable nodes (except for the target controllable node) that the control request signal reaches. Therefore, to prevent unnecessary controllable nodes from responding to the control request signal, step S1105 below would become necessary.

In step S1105, the control unit 704 has the control signal transmission unit 703 transmits a disregard request signal which will be described later, using the control signal interface 701. More specifically, for the disregard request signal, the control unit 704 sets signal intensity that is greater than the maximum among the controllable radio signal intensity of all the target controllable nodes belonging to the set T and is less than the controllable radio signal intensity Wt. By setting such signal intensity, the disregard request signal can reach all the target controllable nodes belonging to the set T, while the disregard request signal does not reach the target controllable node. Also, the control unit 704 sets a control ID (It) as a destination of the disregard request signal.

The disregard request signal is a signal that requests a controllable node designated by a control ID to disregard a control request signal on a certain condition. In other words, a controllable node which receives the disregard request signal is configured to omit an operation that corresponds to a control request signal that meets the certain condition. The disregard request signal can designate various conditions as follows.

For example, the disregard request signal can request a controllable node to disregard a control request signal that is received following the disregard request signal once. In other words, when the controllable node receives such a disregard request signal, it disregards a control request signal which has the same control ID as a destination as the control ID of the controllable node, once.

The disregard request signal can request a controllable node to disregard a control request signal that is received following the disregard request signal for the designated number of times. In other words, when the controllable node receives such a disregard request signal, it disregards a control request signal which has the same control ID as a destination as the control ID of the controllable node, the designated number of times.

The disregard request signal may request to disregard a control request signal which is received next for a designated period. In other words, upon receiving a disregard request signal, the controllable node disregards a control request signal which has the same control ID as a destination as the control ID of the controllable node for a designated period.

Further, the disregard request signal may request to disregard a control request signal which is received next if the signal is a control command of a designated type. In other words, upon receiving the disregard request signal, the controllable node disregards a control request signal which has the same control ID as a destination as the control ID of the controllable node, if the control request signal includes a control command of a designated type.

The disregard request signal may designate various conditions, not limited to the above-mentioned examples. The disregard request signal can be designated by combining multiple conditions (for example, a logical sum of the designated number of times and a designated period). The disregard request signal may include information of some or all of the aforementioned designated number of times, a designated period, a type of a control command; however, if such information is already known in the controllable node, such information is not necessarily included in the disregard request signal.

According to step S1105, it is possible to prevent an unrelated controllable node from responding to a control request signal transmitted in step S1106. After step 1105, the process proceeds to step S1106.

In step S1106, the control unit 704 has the control signal transmission unit 703 transmits a control request signal using the control signal interface 701, and then the process is completed. More specifically, the control unit 704 designates the control ID (It) obtained in step 1101 as a destination of the control request signal. Also, the control unit 704 sets the controllable radio signal intensity Wt obtained in step S1102 for the control request signal. Further, the control unit 704 can set a control command corresponding to the control request for the control request signal.

According to the process shown in FIG. 15, even if more than one controllable node having the same control ID exists on the communication system, it is possible to perform remote control those controllable nodes individually by using the difference of the controllable radio signal intensity among those nodes. In other words, according to the process in FIG. 15, as a result, it is possible to perform remote control individually on more controllable nodes than the number of assignable control IDs.

As explained above, allowing assigning a common control ID to different controllable nodes, the control request node according to the second embodiment individually controls a desired controllable node using a difference in the controllable radio signal intensity between the controllable nodes. More specifically, the control request node transmits a disregard request signal to a controllable node having the same control ID as a desired controllable node and having a controllable radio signal intensity less than that of the desired controllable node, and the control request node prevents the controllable node from responding to a subsequent control request signal. Then, the control request node can perform remote control on the desired controllable node individually, by setting a controllable radio signal intensity of the desired controllable node and transmitting a control request signal. The control request node according to the present embodiment can perform remote control more controllable nodes than the number of the assignable control IDs, since the control IDs are reused.

Regarding the second embodiment, a variation which will be described below can be presumed. Specifically, by modifying a part of the aforementioned process in FIG. 15, the same remote control for a plurality of controllable nodes having the same control ID can be performed at once.

However, there is a constraint on a group of target controllable nodes that can be remotely controlled at once (hereinafter, referred to as "target controllable node group"). Specifically, a target controllable node group should be consecutive, when a plurality of nodes having the same control ID are sorted in an ascending or descending of controllable radio signal intensity. In other words, if there is a controllable node that is not a target of control in the middle of a sequence of the target controllable node group, the controllable node cannot be selected and removed from the target of control; as a result, it is impossible to remotely control only the target controllable node group.

By replacing steps S1102, S1103, S1105, S1106 of FIG. 15 with steps S1202, S1203, S1205, S1206 which will be described below, it becomes possible to perform remote control at once described above.

In step S1202, the control unit 704, obtains controllable radio signal intensity, Wt1, Wt2, . . . Wtn, for n controllable nodes (n is an integral, n 2) included in the target controllable node group. Typically, the control unit 704 obtains the controllable radio signal intensity, Wt1, Wt2, . . . Wtn, for the n controllable nodes by referring to a controllable node list using identification information of the n controllable nodes as keys. The identification information of the n controllable nodes is designated by a control request from, for example, an application. Further, the control unit 704 calculates a minimum Wtmin and a maximum Wtmax of the obtained controllable radio signal intensity Wt1, Wt2, . . . Wtn.

After steps S1101 and S1202 are completed, the control unit 704 refers to the database storing the correspondence between the controllable nodes and the control IDs, and the controllable node list to generate a set T (step S1203). Specifically, the control unit 704 has all the controllable nodes (except for a target controllable node group) belong to the set T which has controllable radio signal intensity not larger than Wtmin and a control ID (It) is assigned thereto.

In step S1205, the control unit 704 has the control signal transmission unit 703 transmit the aforementioned disregard request signal using the control signal interface 701. Specifically, the control unit 704 sets, for the disregard request signal, signal intensity that is greater than maximum controllable radio signal intensity of all the controllable nodes belonging to the set T and less than the controllable radio signal intensity Wtmin. Since such signal intensity is set, the disregard request signal reaches all the controllable nodes belonging to the set T and the disregard request signal does not reach the target controllable node group. The control unit 704 sets a control ID (It) as a destination of disregard request signal.

In step S1206, the control unit 704 has the control signal transmission unit 703 transmit a control request signal using the control signal interface 701, and the process is completed. Specifically, the control unit 704 sets the control ID (It) obtained in step S1101 as a destination of the control request signal. The control unit 704 sets the controllable radio signal intensity Wtmax calculated in step 1202 for the control request signal. Further, the control unit 704 may set a control command corresponding to a control request for a control request signal.

The processing of each of the above-described embodiments can be realized using a general-purpose computer as a basic hard ware. It is possible to provide a program that realizes the processing of each of the above-described embodiments by storing the program in a computer-readable storage medium. Such a program is stored in a storage medium in a file of installable form, or a file of executable form. A storage medium may be a magnetic disk, an optical disc (such as CD-ROM, CD-R, DVD, etc.), a magneto-optical disc (MO, etc.) or a semiconductor memory, as long as it can store a program and is computer-readable. Also, the program that realizes the processing of each of the above-described embodiments may be stored on a computer (server) connected to network such as the Internet and may be downloaded by a computer (client) via network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus controlling a plurality of controllable nodes including a target controllable node, comprising:

a measurement unit configured to measure controllable radio signal intensity which indicates minimum radio signal intensity at which a wireless signal reaches for each of the plurality of controllable nodes;

a control unit configured to assign finite number of identification information to each of the plurality of controllable nodes in ascending or descending order of the controllable radio signal intensity, allowing reuse of the identification information; and a transmission unit configured to:

(A) transmit, if a group of controllable nodes to which target identification information identical to the identification information of the target controllable node is assigned and whose controllable radio signal intensity is smaller than that of the target controllable node exists, a disregard request signal to request to disregard a control request signal whose destination is the target identification information in accordance with maximum controllable radio signal intensity of the group of controllable nodes, a destination of the disregard request signal being the target identification information; and (B) transmit the control request signal in accordance with the controllable radio signal intensity of the target controllable node after (A), the destination of the control request signal being the target identification information.

2. The apparatus according to claim 1, wherein the disregard request signal includes one of information indicating: (a) a period of time to disregard the control request signal; (b) number of times to disregard the control request signal; or (c) a type of control command of the control request signal to be disregarded.

* * * * *